United States Patent [19]

Yamada et al.

[11] Patent Number: 4,945,776

[45] Date of Patent: Aug. 7, 1990

[54] METHOD OF TESTING SPLICED PORTION OF OPTICAL FIBERS

[75] Inventors: Takeshi Yamada; Tsutomu Onodera; Hiroyuki Taya, all of Sakura, Japan

[73] Assignee: Fujikura Ltd., Tokyo, Japan

[21] Appl. No.: 285,701

[22] Filed: Dec. 16, 1988

[30] Foreign Application Priority Data

Dec. 21, 1987 [JP] Japan ................. 62-323508

[51] Int. Cl.⁵ .......................................... C01M 19/00
[52] U.S. Cl. ..................... 73/866; 73/865.9; 356/73.1
[58] Field of Search ............... 73/866, 865.9, 865.8; 356/73.1

[56] References Cited

U.S. PATENT DOCUMENTS

| | | | |
|---|---|---|---|
| 4,498,732 | 2/1985 | Campbell et al. | 350/96.21 |
| 4,812,038 | 3/1989 | Nazarathy et al. | 356/73.1 |
| 4,838,690 | 6/1989 | Buckland et al. | 356/73.1 |

FOREIGN PATENT DOCUMENTS

| | | |
|---|---|---|
| 0215145 | 3/1987 | European Pat. Off. . |
| 103607 | 5/1987 | Japan . |

OTHER PUBLICATIONS

"Method for Evaluating Splicing Loss of Multimode Optical Fiber"; *Patent Abstracts of Japan*; ABS GRP No., p. 626, vol. No. 11, No. 313, pub. Oct. 13, 1987 (English Language Abstract of Japanese Pat. Document 62-103607, ref. L).
A Splicing and Inspection Technique for Single-Mode Fibers Using Direct Core Monitoring; 1984 IEEE; Journal of Lightwave Technology, No. 2, (Apr.); pp. 185-190; Osamu Kewata et al.
Statistical Analysis of Fusion Splice Losses for Single-Mode Fibers; oct. 1984; Applied Optics, vol. 23, No. 19, pp. 3289-3293; Osamu Kawata.

*Primary Examiner*—Tom Noland
*Attorney, Agent, or Firm*—Frishauf, Holtz, Goodman & Woodward

[57] ABSTRACT

In a method of testing a spliced portion of exposed fiber portions of optical fibers, the optical fibers are arranged with each other in line so that ends of the exposed fiber portions are spaced apart from each other by a predetermined distance. The ends of the exposed fiber portions are heated and melted by discharge heating. The optical fibers are then moved in the abutment or closing directions by a predetermined distance, so that the ends of the exposed fiber portions abut against each other to form a spliced portion. The minimum outer diameter value d of the spliced portion is measured. Ratio d/D of minimum value d to value D of the outer diameter of exposed fiber portion is calculated. Spliced portions having splicing defects can be detected by detecting of spliced portions having ratio d/D of less than 1 (d/D<1). That is, spliced portions having ratio d/D of less than 1 (d/D<1) are regarded as splicing defects.

14 Claims, 7 Drawing Sheets

METHOD OF TESTING SPLICED PORTION OF OPTICAL FIBERS

BACKGROUND OF THE INVENTION

1. Field of the Invention

The present invention relates to a method of testing a spliced portion of optical fibers spliced by fusion-splicing so as to eliminate defective products having large splicing losses at the spliced portions.

2. Description of the Related Art

Optical fibers can be spliced by fusion-splicing as follows. Two optical fibers are aligned such that the mating ends of the exposed fiber portions oppose each other and are spaced apart from each other by a predetermined distance. The ends of the exposed fiber portions are heated by, e.g., discharge heating. When the ends of the exposed fiber portions are melted, the optical fibers are pushed toward each other by a predetermined distance so that the ends of the exposed fiber portions abut against each other. These ends are kept heated until they are completely fusion-spliced. Products having large splicing losses which are regarded as defective products often result from fusion-splicing. Splicing defects are found when light is transmitted through the fusion-spliced optical fiber and its optical transmission loss is measured.

If splicing defects are detected by transmitting a light through the fusion-spliced optical fiber and measuring the transmission loss, these operations are time-consuming and cumbersome. Systematic and efficient splicing operations of optical fibers on working spots cannot be expected.

SUMMARY OF THE INVENTION

It is an object of the present invention to provide a method of testing a spliced portion of optical fibers, wherein a spliced portion having a large splicing loss can be easily detected, and systematic and efficient splicing operations on optical fiber installation spots can be ensured.

According to the present invention, there is provided a method of testing a spliced portion of optical fibers, comprising the steps of:

aligning in line a pair of optical fibers with a predetermined distance therebetween so that ends of exposed fiber portions of the optical fibers are opposite to each other;

heating and melting the ends of the exposed fiber portions;

pushing the optical fibers toward each other by a predetermined distance so that the melted ends of the exposed fiber portions abut against each other to form a spliced portion;

measuring a minimum value of an outer diameter of the spliced portion; and calculating a ratio of the measured minimum value to an outer diameter of the exposed fiber portion of the optical fiber.

According to the present invention, there is further provided a method of testing a spliced portion of optical fibers, comprising the steps of:

aligning in line a pair of optical fibers with a predetermined distance therebetween so that ends of exposed fiber portions of the optical fibers are opposite to each other;

heating and melting the ends of the exposed fiber portions, while pushing the optical fibers toward each other by a predetermined distance so that the melted ends of the exposed fiber portions abut against each other to form a spliced portion;

measuring a minimum value of an outer diameter of the spliced portion; and calculating a ratio of the measured minimum value to an outer diameter of the exposed fiber portion of the optical fiber.

DETAILED DESCRIPTION OF THE PREFERRED EMBODIMENT

Figure 1A:
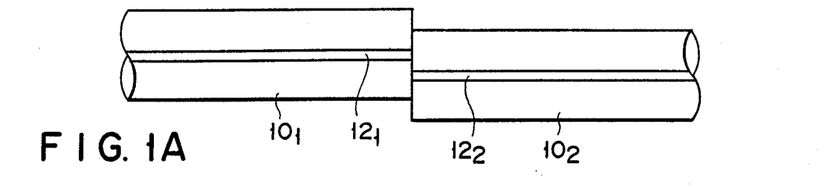
FIGS. 1A to 1C are views each showing a spliced portion of a pair of exposed fiber portions of optical fibers fusion-spliced or to be fusion-spliced.

Causes of splicing defects are initial axial-displacement of exposed fiber portions of optical fibers to be fusion-spliced or distortion of a core of each exposed fiber portion. The initial axial-displacement is defined as a displacement between axes of two exposed fiber portions $10_1$ and $10_2$ of optical fibers to be fusion-spliced, as shown in FIG. 1A. When the axial-displacement is large, splicing defects occur. However, if the axial-displacement is 10 $\mu$m or less (this axial displacement rarely exceeds 10 $\mu$m if a current fusion-splicing apparatus is used) and a discharge heating time is given as about 15 seconds, the configuration of the exposed fiber portions can coincide with each other by a surface tension of melted glass, thereby correcting the axial-displacement. Therefore, the initial axial-displacement of 10 $\mu$m or less need not be taken into consideration for splicing defects. Therefore, loss caused by such an axial-displacement can be neglected.

Figure 1B:
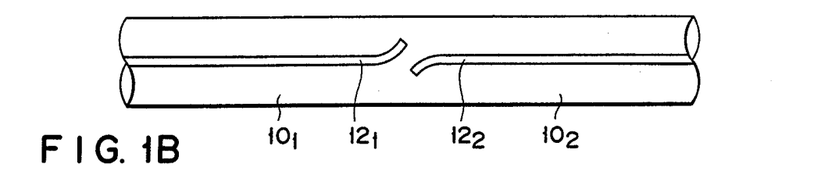
Figure 1C:
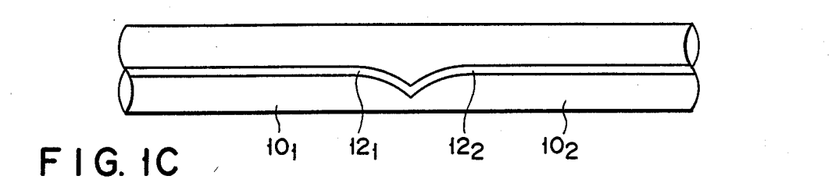

Core distortion is a phenomenon wherein cores $12_1$ and $12_2$ at a spliced portion shown in FIG. 1B or 1C are bent. Core distortion often occurs when a large initial axial-displacement of 10 $\mu$m or more is present. More specifically, when the large initial axial-displacement of 10 $\mu$m or more is present, the displacement is eliminated by subsequent heating and melting, but cores $12_1$ and $12_2$ are separated from each other, as shown in FIG. 1B.

Such core distortion, however, does not cause a large splicing loss in a 1.3 μm wavelength optical fiber.

However, core distortion of such a type as in exposed fiber portions $10_1$ and $10_2$ of FIG. 1C, wherein cores $12_1$ and $12_2$ are bent at a spliced portion, though no axial-displacement occurs, causes a large loss.

When core distortion shown in FIG. 1C is detected, a spliced portion having a large splicing loss can be detected.

Figure 2A:
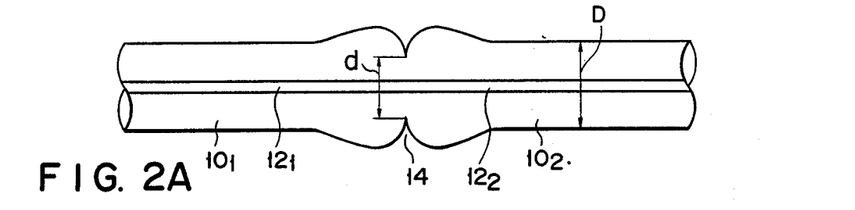
FIGS. 2A and 2B are views each showing a spliced portion of a pair of fusion-spliced exposed fiber portions of optical fibers.
Figure 2B:
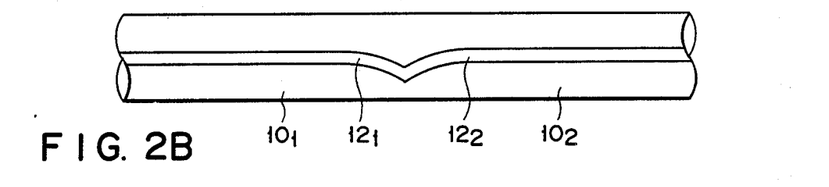

The core distortion shown in FIG. 1C occurs due to the following mechanism. If pushing amounts, i.e., pushing distances, of a pair of exposed fiber portions $10_1$ and $10_2$ are not sufficient to fusion-splice optical fibers, the outer diameter of abutment portion 14 of the spliced portion is small, as shown in FIG. 2A. In other words, the minimum value of the outer diameter of the spliced portion is small. If such a small-diameter portion is present and then heating continues 10 seconds or longer after completion of pushing, melted glass flows in the small-diameter portion by the surface tension. Therefore, cores $12_1$ and $12_2$ of the spliced portion are bent, as shown in FIG. 2B.

The present invention provides the following method of testing a spliced portion. Exposed fiber portions $10_1$ and $10_2$ of optical fibers are arranged with each other in line so that ends of the exposed fiber portions are spaced apart from each other by a predetermined distance. The ends of the exposed fiber portions are heated and melted by discharge heating or the like. The optical fibers are then moved in the abutment or closing directions by a predetermined distance, so that the ends of the exposed fiber portions abut against each other to form a spliced portion. The minimum outer diameter value $\bar{d}$ (outer diameter of abutment portion 14) of the spliced portion is measured. Ratio $d/D$ of minimum value $\bar{d}$ to value $D$ of the outer diameter of the exposed fiber portion (i.e., the outer diameter of the exposed fiber portion, which is measured before heating, or the outer diameter of the exposed fiber portion spaced apart from the heated portion, which is measured after heating) is calculated. Spliced portions having splicing defects can be detected by detecting of spliced portions having ratio $d/D$ of less than 1. That is, spliced portions having ratio $d/D$ of less than 1 ($d/D<1$) are regarded as splicing defects.

When actual experiments were conducted, outer diameter ratios were found to almost correspond to loss values (to be described later).

Splicing losses caused by a shortage of pushing amounts pose problems, in especial, in fusion-splicing of ribbon optical fibers. If exposed fiber portions of ribbon optical fibers are cut at different lengths, e.g., if one of the exposed fiber portions is shorter than the remaining exposed fiber portions, the longer exposed fiber portions interfere with pushing to the shorter exposed fiber portion to result in a shortage of the pushing amount to the shorter exposed fiber portion. Therefore, core distortion shown in FIG. 1C tends to be formed in a spliced portion of the shorter exposed fiber portion. In this manner, core distortion shown in FIG. 1C tends to occur due to differences in length between the adjacent exposed fiber portions. For this reason, the method according to the present invention in which splicing defects caused by such core distortion are easily detected, is particularly effective in testing of spliced portions of ribbon optical fibers.

Minimum outer diameter value $\bar{d}$ is generally, preferably measured before a surface tension of the exposed fiber portion occurs, and preferably performed 0.5 to 2 seconds after the start of arc discharge. The reason for this is that the exposed fiber portions will abut against each other when about 0.5 second has passed from application of an arc, and a surface tension will not occur within about 2 seconds from application of an arc. However, the time period will change according to various parameters of fusion-splicing, for example, the strength of discharging arc, the size of the fiber, or the distances between the fiber and the discharging electrodes.

Diameter $D$ of the exposed fiber portion is also measured by an observation apparatus. Spliced portions having ratio $d/D$ of less than 1 are estimated as ones having large splicing losses. Outer diameter $D$ of the exposed fiber portion may be measured prior to heating.

Figure 3:
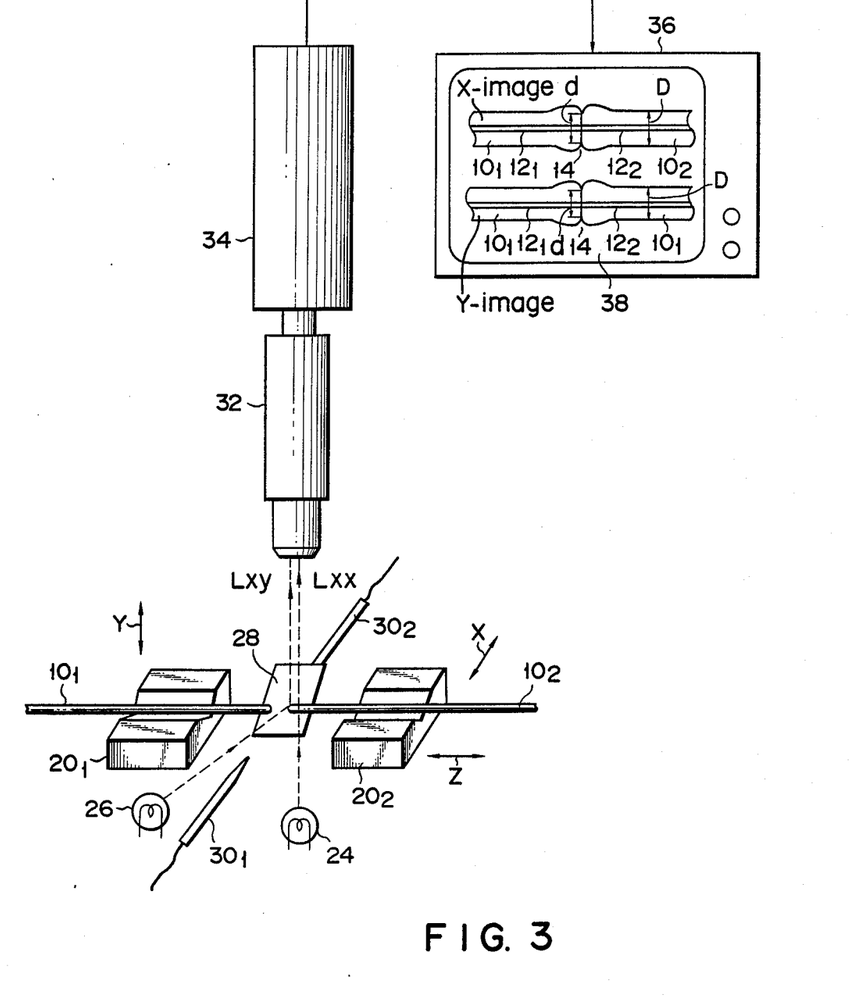
FIG. 3 is a view showing a fusion-splicing apparatus used to fusion-splice a pair of optical fibers.
Figure 4A:
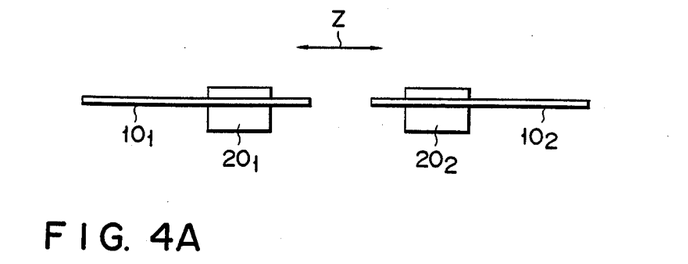
FIGS. 4A to 4D are views showing a pair of exposed fiber portions of optical fibers and the associated members, at respective steps in fusion-splicing the exposed fiber portions.
Figure 4B:
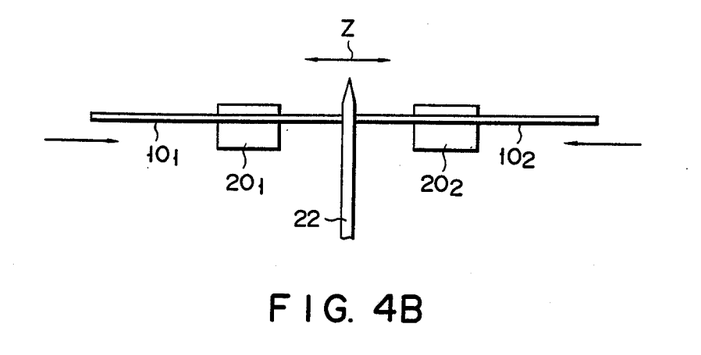
Figure 4C:
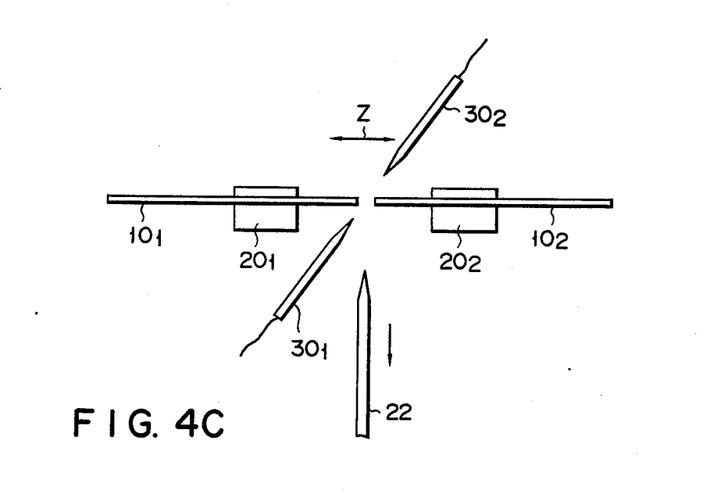
Figure 4D:
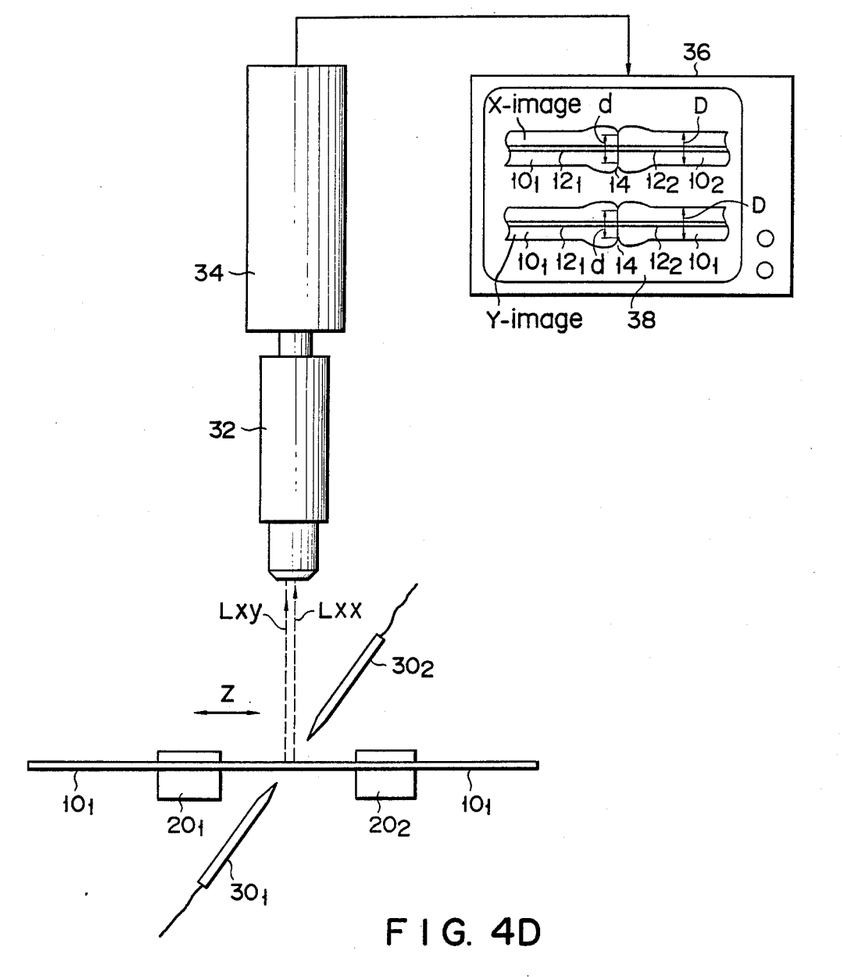
Figure 5:
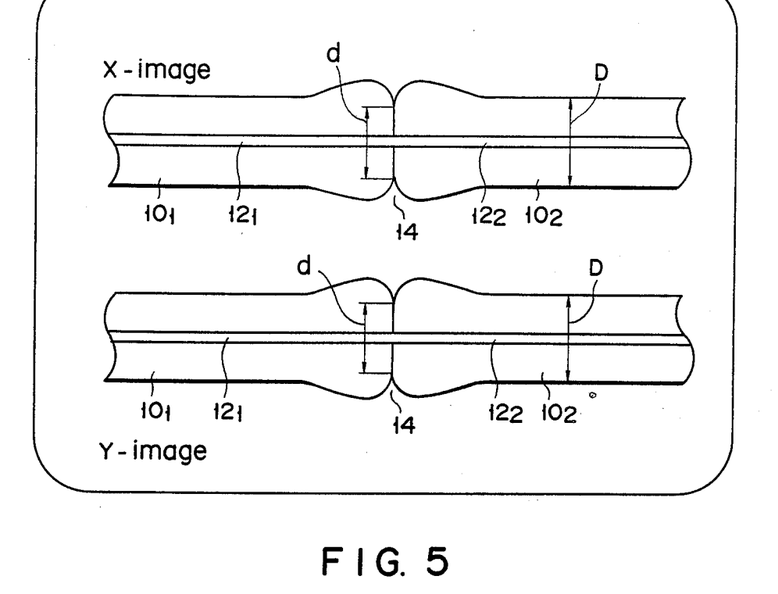
FIG. 5 is an enlarged view of X and Y images of the exposed fiber portions displayed on a monitor screen shown in FIG. 3.

An embodiment of the present invention will be described with reference to FIG. 3, FIGS. 4A to 4D, and FIG. 5. FIG. 3 is a perspective view showing an overall arrangement of a fusion-splicing apparatus, FIGS. 4A to 4D are views showing testing steps according to the method of the present invention, and FIG. 5 is an enlarged view showing X and Y images of exposed fiber portions displayed on a monitor screen shown in FIG. 3.

In this embodiment, the present invention is applied to ordinary single optical fibers.

The protection jackets are removed from those ends of a pair of optical fibers, which are to be fusion-spliced. Exposed fiber portions $10_1$ and $10_2$ of the optical fibers are supported in V-grooves of V-groove members $20_1$ and $20_2$ to oppose each other in the Z direction (FIGS. 3 and 4A). Thereafter, for example, an abutment rod, i.e., stopper 22 (FIG. 4B) is located between exposed fiber portions $10_1$ and $10_2$, and fiber portions $10_1$ and $10_2$ are moved close to each other in the Z direction until fiber portions $10_1$ and $10_2$ are brought into contact with stopper 22, thereby setting an initial distance between fiber portions $10_1$ and $10_2$. Stopper 22 is removed, and, as shown in FIG. 4C, an arc is generated by discharge electrodes $30_1$ and $30_2$ arranged near the opposite ends of exposed fiber portions $10_1$ and $10_2$. The opposite ends of fiber portions $10_1$ and $10_2$ are heated and melted. When the ends of fiber portions $10_1$ and $10_2$ are melted, fiber portions $10_1$ and $10_2$ are moved or pushed toward and abutted against each other (FIG. 4C). The heating and melting of the opposite ends of fiber portions $10_1$ and $10_2$ may be performed, while moving or pushing the fiber portions onto each other. The abutment or spliced portion of fiber portions $10_1$ and $10_2$ is displayed as images on monitor screen 38 of display unit 36 through microscope 32 and television camera 34 (FIG. 4D). In this case, if the axial direction of each fiber portion is given as the Z direction, an image (X image) observed in the X direction perpendicular to the Z direction and an image (Y image) observed in the Y direction perpendicular to the Z direction are displayed on monitor screen 38 (FIG. 5). Minimum values of the outer diameters of spliced portions of the X and Y images are measured on monitor screen 38 by using a scale, and a smaller one of the measured minimum values is defined as minimum outer diameter value $\bar{d}$ which is used to determine a ratio to outer diameter $D$ of the exposed fiber portion. Ratio $d/D$ of the minimum outer diameter value $\bar{d}$ of spliced portion to the outer diameter $D$ of the exposed fiber portion is calculated. Diameter $D$ may be measured before, during, or after fusion-splicing. If ratio $d/D$ is less than 1 ($d/D<1$), it is determined that a splicing loss falls outside an allowable range. The corresponding fibers are determined as splicing defects. However, if ratio d/D is equal to or larger than 1 (d/D≧1), the splicing loss of the optical fibers falls within the allowable range. The resultant fiber product is determined to be a good product.

As is apparent from the above description of this embodiment, according to the method of testing a spliced portion of optical fibers of the present invention, the following advantage can be provided. Optical fibers are pushed toward each other by a predetermined distance so that ends of the exposed fiber portions of the optical fibers abut against each other, and a spliced portion is formed. A minimum outer diameter value of the spliced portion is measured. Ratio d/D of measured minimum outer diameter value $\bar{d}$ to outer diameter D of the exposed fiber portion is calculated to detect quality of the spliced portion. Therefore, the testing procedures can be simplified.

Referring to FIG. 3, light source 24 is used to emit light beam Lxx onto microscope 32 through the spliced portion between exposed fiber portions $10_1$ and $10_2$ in the X direction. The X image is displayed on monitor screen 38 by this light beam Lxx. Light source 26 is used to obtain light beam Lxy which passes through the spliced portion of fiber portions $10_1$ and $10_2$ in the Y direction and which is deflected in the X direction by mirror 28. The Y image of the exposed fiber portions can be displayed on monitor screen 38 by light beam Lxy.

Figure 6:
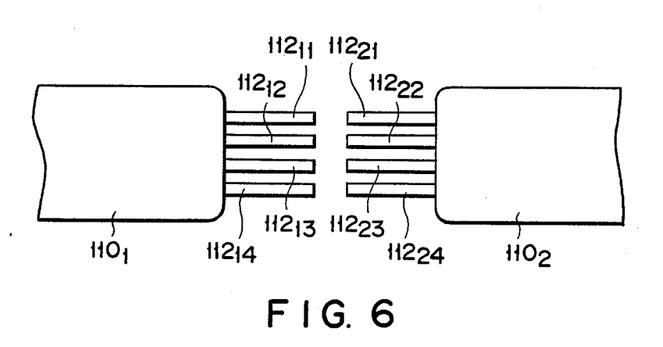
FIG. 6 is a view showing a pair of ribbon optical fibers to be fusion-spliced.

As described earlier, the splicing loss caused by a shortage of a pushing amount poses a problem, in particular, when ribbon optical fibers are spliced. More specifically, when the lengths of exposed fiber portions of a ribbon optical fiber are not equal to each other, core distortion shown in FIG. 1C tends to occur. Then, according to the method of the present invention capable of easily detecting splicing defects caused by core distortion, 64 exposed fiber portions of sixteen pairs of ribbon optical fibers were fusion-spliced, and their splicing losses were measured. For illustrative convenience, only one pair of ribbon optical fibers $110_1$ and $110_2$ are illustrated in FIG. 6. Ribbon optical fibers $110_1$ and $110_2$ are arranged in a line so that ends of the exposed fiber portions $112_{11}$-$112_{14}$ of optical fiber $110_1$ are opposite to ends of the exposed fiber portions $112_{21}$-$112_{24}$ of optical fiber $110_2$. Exposed fiber portions $112_{11}$ and $112_{21}$, $112_{12}$ and $112_{22}$, $112_{13}$ and $112_{23}$, and $112_{14}$ and $112_{24}$ are fusion-spliced, respectively. In this case, steps of fusion-splicing ribbon optical fibers are substantially the same as those of ordinary single optical fibers, and a detailed description and its illustration will be omitted.

Each fiber used had an outer diameter of 125 $\mu$m, a core diameter of 9 $\mu$m, a core/cladding refractive index difference of 0.3%, and a transmission loss of 0.5 dB/km when light having a wavelength of 1.3 $\mu$m was transmitted.

Exposed fiber portions of one group of ribbon optical fibers were cut by a cutting apparatus having a cutting blade with an appropriate cutting angle and a cutting surface to prepare fibers having good cutting surfaces, and exposed fiber portions of the other group of ribbon optical fibers were also cut by a cutting apparatus having a cutting blade with an inappropriate cutting angle and an inappropriate cutting surface to prepare fibers having inappropriate cutting surfaces so as to compare the test results of the fibers having good and inappropriate cutting surfaces. These exposed fiber portions were selectively combined to prepare 64 portions to be fusion-spliced. Outer diameter ratios d/D of the 64 spliced portions were calculated in the same manner as described above. Light was transmitted through the spliced portions of the spliced optical fibers to measure splicing loss values.

Figure 7:
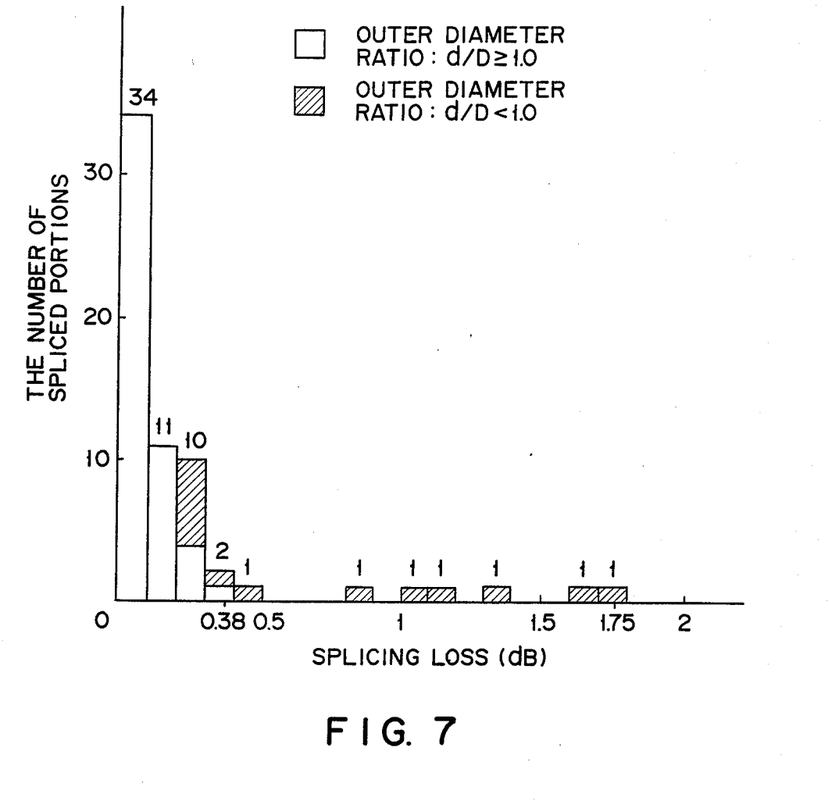
FIG. 7 is a histogram of splicing losses of spliced portions which are obtained on the basis of experimental results of fusion-splicing of a plurality of ribbon optical fibers.

The resultant splicing loss histogram is shown in FIG. 7. An average value of the splicing losses of the 64 spliced portions was 0.2 dB, the maximum value was 1.75 dB, and a standard deviation was 0.37 dB. Hollow rectangular regions represent the numbers of spliced portions for d/D≧1, while hatched rectangular regions represent the numbers of spliced portions for d/D<1. The number of spliced portions for d/D≧1 was 50, the average value of their splicing losses was 0.08 dB, their maximum value was 0.38 dB, and their standard deviation was 0.08 dB. It is apparent from FIG. 7 that the spliced portions for d/D<1 (hatched rectangular regions) are closely associated with large splicing losses.

Figure 8:
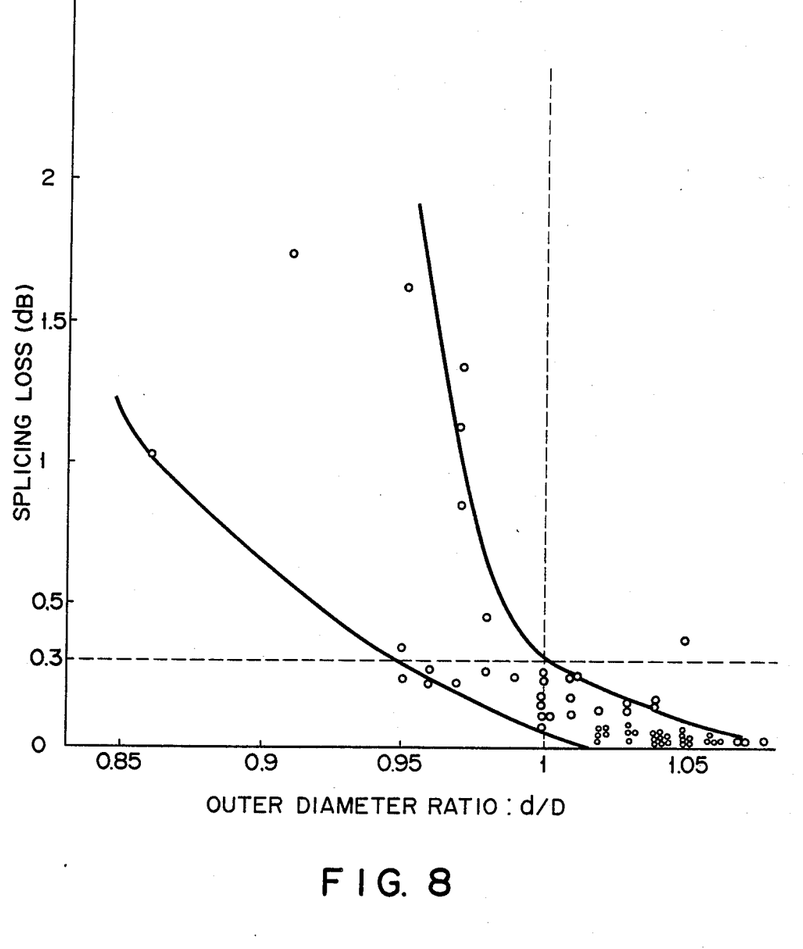
FIG. 8 is a graph showing characteristic curves each showing a relationship between an outer diameter ratio (a ratio of minimum outer diameter value $\bar{d}$ of a spliced portion to outer diameter D of an exposed fiber portion) and the splicing loss on the basis of experimental results of fusion-splicing of a plurality of ribbon optical fibers.

The relationship between the outer diameter ratio and the splicing loss was obtained. Results are shown in FIG. 8. The abscissa represents the outer diameter ratio d/D, and the ordinate represents the splicing loss, thereby representing the relationship between the outer diameter ratio and the splicing loss. As is apparent from FIG. 8, spliced portions for d/D<1 have large splicing losses. It is also found that outer diameter ratio d/D must be 1 or more (d/D≧1) to obtain a splicing loss of 0.3 dB or less.

According to the method of testing a spliced portion of optical fibers of the present invention, optical fibers are pushed toward each other by a predetermined distance so that the exposed fiber portions of the optical fibers abut against each other, and a spliced portion is formed. A minimum outer diameter value of the spliced portion is measured. Ratio d/D of measured minimum outer diameter value $\bar{d}$ to outer diameter D of the exposed fiber portion is calculated to detect quality of the spliced portion. Therefore, the testing procedures can be simplified.

What is claimed is:

1. A method of testing a spliced portion of single-mode optical fibers comprising the steps of:
   aligning in line a pair of optical fibers with a predetermined distance therebetween so that ends of exposed fiber portions of said aligned optical fibers are opposite to each other;
   heating and melting said ends of said exposed fiber portions;
   pushing said aligned optical fibers toward each other by a predetermined distance so that said melted ends of said exposed fiber portions abut against each other to form a spliced portion;
   measuring a minimum value "d" of an outer diameter of said spliced portion before a surface tension of said exposed fiber portions occurs; and
   calculating a ratio of the measured minimum value "d" to an outer diameter "D" of said exposed fiber portion of said optical fiber.

2. A method of testing a spliced portion of single-mode optical fibers according to claim 1, wherein said calculating step is carried out to determine whether d/D≧1 or d/D<1.

3. A method of testing a spliced portion of single-mode optical fibers according to claim 1, wherein said outer diameter of said exposed fiber portion is measured before said heating step.

4. A method of testing a spliced portion of single-mode optical fibers according to claim 1, wherein said outer diameter of said exposed fiber portion is measured during said heating step.

5. A method of testing a spliced portion of single-mode optical fibers according to claim 1, wherein said outer diameter of said exposed fiber portion is measured after said heating step.

6. A method of testing a spliced portion of single-mode optical fibers according to claim 1, wherein said optical fiber is a single optical fiber.

7. A method of testing a spliced portion of single-mode optical fibers according to claim 1, wherein said optical fiber is a ribbon optical fiber.

8. A method of testing a spliced portion of single-mode optical fibers, comprising the steps of:
 aligning in line a pair of optical fibers with a predetermined distance therebetween so that ends of exposed fiber portions of said aligned optical fibers are opposite to each other;
 heating and melting said ends of said exposed fiber portions, while pushing said aligned optical fibers toward each other by a predetermined distance so that said melted ends of said exposed fiber portions abut against each other to form a spliced portion;
 measuring a minimum value of "d" of an outer diameter of said spliced portion before a surface tension of said exposed fiber portions occurs; and
 calculating a ratio of said measured minimum value "d" to an outer diameter "D" of said exposed fiber portions of said optical fiber.

9. A method of testing a spliced portion of single-mode optical fibers according to claim 8, wherein said calculating step is carried out to determine whether $d/D \geqq 1$ or $d/D < 1$.

10. A method of testing a spliced portion of single-mode optical fibers according to claim 8, wherein said outer diameter of said exposed fiber portion is measured before said heating step.

11. A method of testing a spliced portion of single-mode optical fibers according to claim 8, wherein said outer diameter of said exposed fiber portion is measured during said heating step.

12. A method of testing a spliced portion of single-mode optical fibers according to claim 8, wherein said outer diameter of said exposed fiber portion is measured after said heating step.

13. A method of testing a spliced portion of single-mode optical fibers according to claim 8, wherein said optical fiber is a single optical fiber.

14. A method of testing a spliced portion of single-mode optical fibers according to claim 8, wherein said optical fiber is a ribbon optical fiber.

* * * * *